United States Patent [19]

Baker et al.

[11] Patent Number: 4,532,192
[45] Date of Patent: Jul. 30, 1985

[54] FUEL CELL SYSTEM

[75] Inventors: Bernard S. Baker, Brookfield Center; Hossein G. Ghezel-Ayagh, Fairfield, both of Conn.

[73] Assignee: Energy Research Corporation, Danbury, Conn.

[21] Appl. No.: 668,703

[22] Filed: Nov. 6, 1984

[51] Int. Cl.³ ............................................. H01M 8/06
[52] U.S. Cl. ...................................... 429/19; 429/20; 429/26; 429/17
[58] Field of Search ....................... 429/19, 20, 26, 17, 429/14, 46, 16, 30, 21

[56] References Cited

U.S. PATENT DOCUMENTS

| | | | |
|---|---|---|---|
| 3,446,674 | 6/1969 | Giner | 429/17 |
| 3,488,226 | 1/1970 | Baker et al. | 429/16 |
| 4,001,041 | 1/1977 | Menard | 429/19 X |
| 4,004,947 | 1/1977 | Bloomfield | 429/17 |
| 4,080,487 | 3/1978 | Reiser | 429/16 |
| 4,182,795 | 1/1980 | Baker et al. | 429/13 |

Primary Examiner—Anthony Skapars

[57] ABSTRACT

A fuel cell system of the internally reforming type wherein the gas exhausted from the anode section of the fuel cell of the system is applied to a gas separation means which separates the fuel process gas from the exhausted gas to the exclusion of the other gas constituents in said exhausted gas.

21 Claims, 3 Drawing Figures

FUEL CELL SYSTEM

BACKGROUND OF THE INVENTION

This invention relates to fuel cell systems and, in particular, to fuel cell systems in which fuel gas for the system is generated by reforming the hydrocarbon content of fuel from a fuel supply.

In fuel cell systems, fuel cells are utilized as a means of generating electricity. In a fuel cell, a fuel process gas such as hydrogen is galvanically combusted with an oxidant process gas, usually oxygen, to form electricity and water. In most fuel cell systems of commercial interest, the fuel process gas or hydrogen is derived from a fossil fuel (i.e., one having hydrocarbon content) such as natural gas, oil or even coal by a chemical reaction. The most common chemical reaction is steam reforming wherein steam and the fuel are reacted in a separate fuel reformer to form hydrogen and carbon dioxide. This latter reaction is endothermic.

Since it is impractical for most fuel cells operating on a fuel process gas containing a mixture of hydrogen and carbon dioxide to consume all of the hydrogen, the usual practice is to recycle the unused hydrogen-carbon dioxide mixture to a burner where heat is recovered. This heat is then used to heat the fuel reformer to thereby sustain the endothermic reforming reaction. In present day systems, the highest utilization or consumption of hydrogen process gas in a fuel cell is about 85%, so that the balance of the hydrogen process gas is used to generate heat for the fuel reformer.

Not all fuel cells, however, require an external fuel processor or reformer. U.S. Pat. No. 3,488,266 describes a fuel cell system in which the fuel processing may be effected directly in the anode chamber of the fuel cell. In the disclosed system, the unused process gas contained in the anode exhaust or tail gas is utilized in a manner similar to that of the external reforming systems. Thus, after the gas is passed through a preheater for the incoming fuel, it is then passed to an external unit which recovers waste heat for steam generation. Alternatively the unused gas may be burned in order to generate waste heat for the preheater.

U.S. Pat. No. 4,182,795 discloses another fuel cell system in which internal reforming is carried out in electrolyte-isolated channels in a stack of high temperature fuel cells such as, for example, molten carbonate fuel cells. In this case, waste heat from the fuel cell is used to react fuels such as methanol and methane with water to form hydrogen process gas internally of the cells. This is made possible because the molten carbonate fuel cells operate at sufficiently high temperatures to support the endothermic reforming heat quality and because the quantity of heat produced by the fuel cell stack is in excess of that required by the reforming reaction.

In the system of the '795 patent, however, it is still impractical to consume more than about 85 or 90% of the hydrogen process gas formed. This difficulty arises because the partial pressure of the hydrogen drops to a low level. This can be exacerbated by slight maldistributions between cells when a large number of cells are common manifolded into a stack. The anode exhaust gas of one cell thus contains substantial amounts of unused hydrogen while other cells are starved for fuel.

In the '795 system, instead of using the exhaust gas for waste heat recovery, as in the '226 patent, it is recirculated back to the anode. It has been found, however, that the recirculated exhaust gas is dilute and leads to lower cell performance, since the recycling tends to build up the concentration of carbon dioxide and water if the latter is not removed by condensation.

It is also necessary with molten carbonate fuel cells to recycle the carbon dioxide produced at the anodes of the cells to the cathodes of the cells where it is needed as a reactant in accordance with the reaction:

$$2e + CO_2 + \tfrac{1}{2}O_2 = \rightarrow CO_3^= \qquad (a)$$

This recycle is usually accomplished by completing the combustion of a portion of the anode exhaust gas so that it contains no fuel process gas, i.e., no hydrogen or carbon monoxide, and mixing the combusted anode exhaust gas with the fresh air required to supply the cathode oxygen in accordance with reaction (a). Unfortunately, by this means a very dilute cathode reactant gas is formed. In particular, the concentrations of carbon dioxide and oxygen needed for reaction (a) are very low because of all the dilution caused by the nitrogen in the air. The low partial pressure of reactants lowers the system performance.

It is therefore an object of the present invention to provide a fuel cell system having enhanced characteristics It is a further object of the present invention to provide a fuel cell system wherein fuel process gas is more efficiently used.

It is a further object of the present invention to provide a fuel cell system wherein internal reforming is used to produce hydrogen fuel process gas and wherein utilization of the hydrogen gas is increased.

It is yet a further object of the present invention to provide a fuel cell system of the latter type wherein the partial pressure of the hydrogen process gas is increased and wherein the partial pressure of the oxidant process gas and carbon dioxide entering the fuel cell anode is also increased.

SUMMARY OF THE INVENTION

In accordance with the principles of the present invention, the above and other objectives are realized in an internally reforming fuel cell system of the above-described type wherein the gas exhausted from the anode section of the fuel cell of the system is applied to a gas separation means, and wherein the gas separation means acts to remove unused fuel process gas from the exhaust gas to the exclusion of other gas constituents. The removed fuel process gas, no longer diluted by the other gas constituents, is then applied as input fuel process gas to the anode section of a fuel cell. The fuel cell system thus experiences a higher overall utilization of its fuel process gas.

Removal of unused fuel process gas from the anode exhaust gas also reduces the dilution effects caused by the unused process gas on the other constituents contained in the exhaust gas. This is extremely beneficial where the fuel cell system employs a molten carbonate fuel cell since the exhaust gas now contains substantial amounts of fuel-free, undiluted carbon dioxide which can be fed to the cathode section of the molten carbonate cell at a higher partial pressure.

In a further aspect of the invention, the separation means employed to separate the process gas is a gas transfer device. A preferable, gas transfer device is an electrochemical cell such as, for example, a phosphoric acid fuel electrochemical cell.

In yet a further aspect of the invention, a shift reactor is placed forward of the separation means to increase the amount of available unused fuel process gas in the anode exhaust gas.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
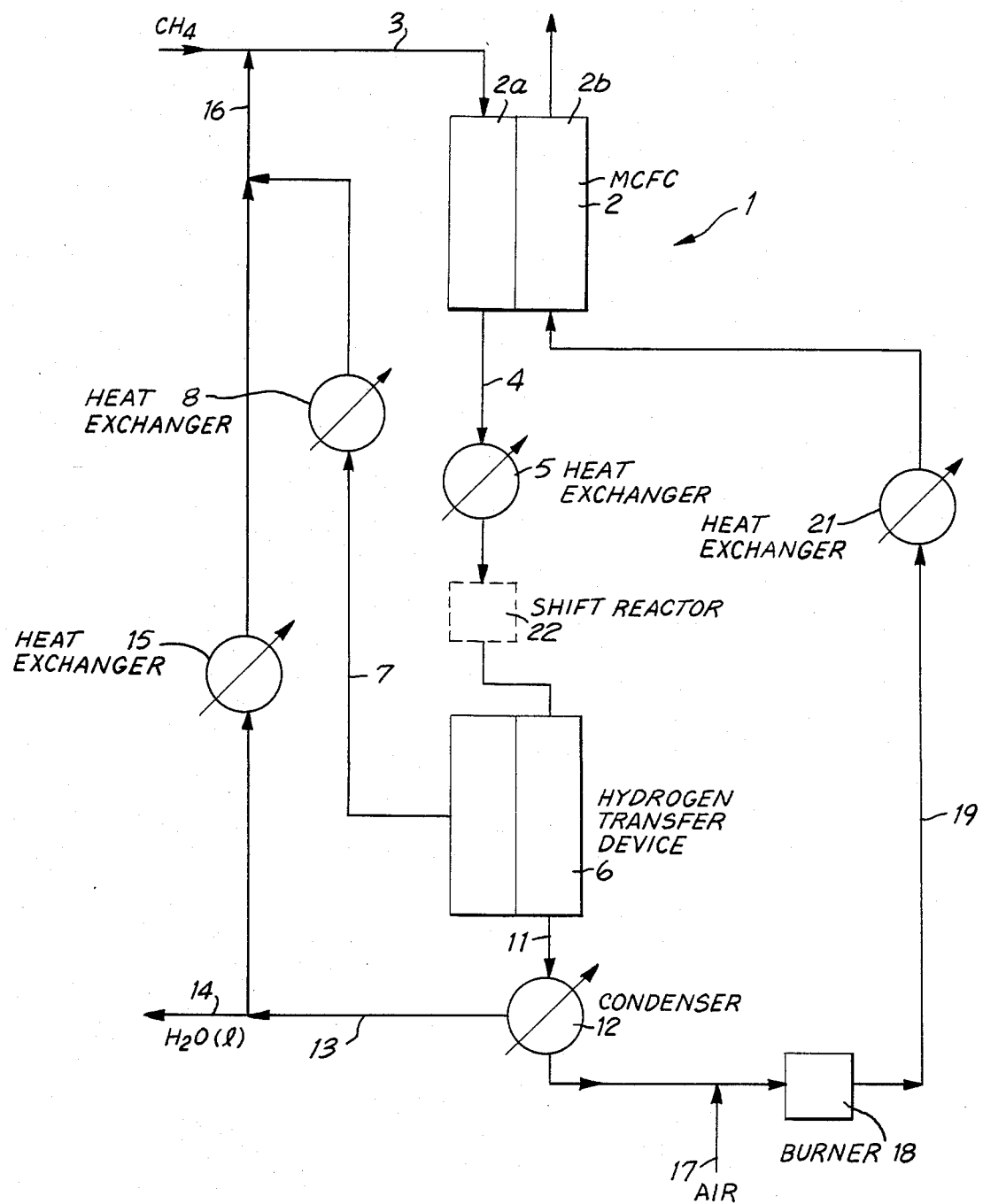
FIG. 1 illustrates a fuel cell system in accordance with the principles of the present invention.

FIG. 1 shows a fuel cell system 1 in accordance with the principles of the present invention. The fuel cell system comprises a high temperature fuel cell (i.e., one operating at a temperature of about 600° C. or above), having an anode section 2a and a cathode section 2b.

For purposes of discussion, the fuel cell 2 is assumed to be a molten carbonate fuel cell, but the principles of the invention are applicable to other high temperature fuel cells such as, for example, solid oxide fuel cells.

The cell 2 is also of an internal reforming type and supply fuel containing hydrocarbon content, shown as methane on supply line 3, is reformed in the cell to produce hydrogen fuel process gas and carbon dioxide. Gas of this makeup thus flows through the anode section 2a and undergoes electrochemical reaction in the cell 2. This results in an anode tail or exhaust gas containing unused hydrogen, water, small amounts of methane and carbon monoxide and substantial amounts of carbon dioxide. This exhaust gas is delivered from the anode section 2a to the output anode line 4.

As discussed above, in prior art systems, a portion of the anode exhaust gas in line 4 would be directly recirculated back to the input line 3, while a portion would be burned and the resultant product recirculated to the cathode section 2b. However, as also discussed above, this results in the recirculation of dilute gas components which prevent the system from achieving maximum efficiency and performance.

In accordance with the principles of the present invention, the anode exhaust gas, after being cooled in a heat exchanger 5, is passed through a gas separation device 6 which is adapted to separate unused hydrogen process gas from the exhausted gas to the exclusion of the other constituents in the exhausted gas. The device 6 thus provides on output line 7 a substantially pure hydrogen process gas stream. This gas stream is passed through a further heat exchanger 8 and then conveyed to input fuel line 3 for recirculation to the anode section 2a.

The portion of the anode exhaust gas remaining after separation of the hydrogen gas stream, contains largely carbon dioxide and water, but also hydrogen and some trace amounts of methane and carbon monoxide. This remaining gas is fed by the separation device 6 to a second output line 11.

A condenser 12 in the line 11 removes the water from this stream and the stream is then combined with oxidant supply, shown as air, conveyed on line 17. A burner 18 burns any hydrogen remaining in the combined gases and the resultant mixture, which is now rich in carbon dioxide, is passed through heat exchanger 21 in line 19 and from the heat exchanger into the fuel cell cathode section 2b.

The water removed from the stream in line 11 is passed over line 13 to a heat exchanger 15. The water is then added to the undiluted hydrogen gas from line 7 and the combined stream on line 16 is supplied to input fuel line 3. Bleed line 14 allows excess water to be bled from line 13.

As can be appreciated, the presence of the gas separation device 6 results in undiluted hydrogen being recycled back to the anode section 2a of the fuel cell 2. This enables the hydrogen, which is now at a higher partial pressure, to be effectively used as process gas by the cell. The overall efficiency and performance of the cell is thereby enhanced.

Likewise, the gas delivered to line 11 is no longer diluted by large unused process gas and contains substantial amounts of carbon dioxide. This results in the presence of carbon dioxide at higher partial pressure in the stream 19 and thereby higher performance of the fuel cell system. Moreover, because less air is required to burn the spent fuel, there is less nitrogen and therefore the oxygen partial pressure also improves.

In order to recover increased amounts of hydrogen process gas for recycling, the system 1 can be further modified to include a shift reactor in the line 4 between the heat exchanger 5 and gas transfer device 6. The reactor 22 converts any carbon monoxide in line 4 to carbon dioxide and hydrogen by the reaction:

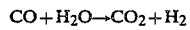

$$CO + H_2O \rightarrow CO_2 + H_2$$

As a result, the hydrogen content of the exhausted gas delivered to the gas transfer device 6 is increased. This, in turn, enables more hydrogen to be recovered by the device for supply to the fuel cell via lines 7, 16 and 3.

In accordance with the invention, a preferable form of the gas separation device 6 is a hydrogen transfer device and a preferable form of hydrogen transfer device is an electrochemical cell. A particularly attractive electrochemical cell is phosphoric acid electrochemical cell.

Figure 2:
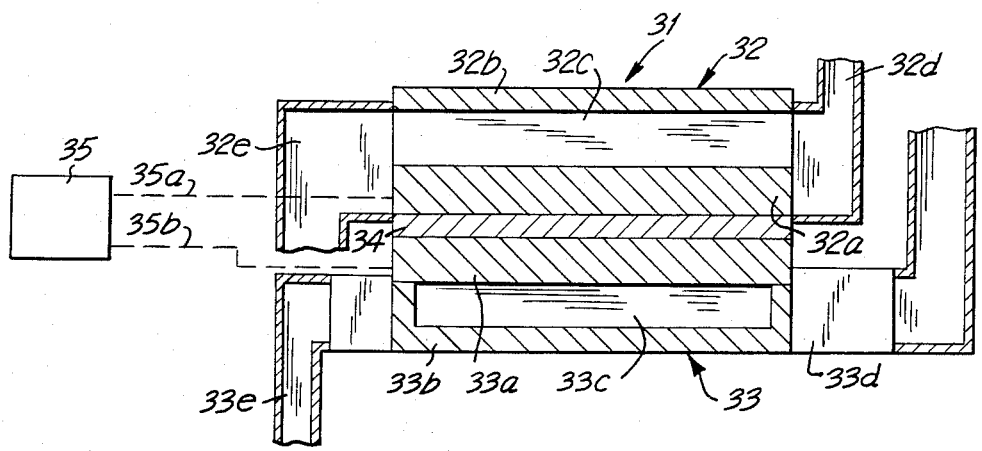
FIG. 2 shows an electrochemical cell usable as the gas transfer device shown in FIG. 1.

FIG. 2 shows an electrochemical cell 31 useable as the device 6. The cell 31 comprises an anode section 32 including an anode electrode 32a and a plate 32b defining an anode gas passage 32c. An input conduit 32d delivers anode gas to the gas passage 32c and an output conduit 32e extracts exhaust gas therefrom.

The cell 31 also includes a cathode section 33 having a cathode 33a and a plate 33b defining a cathode gas passage 33c. Gas is delivered to gas passage 33c via input conduit 33d and extracted therefrom via conduit 33e.

A matrix 34 carrying the cell electrolyte is sandwiched between the electrodes 32a and 33a. Electrical energy is, in turn, delivered to the electrodes via lines 35a and 35b connected to voltage source 35. In a typical cell 31 the electrodes 32a and 33a might each be platinum-on-carbon electrodes.

When utilizing the cell 31 of FIG. 2 in the system 1, the anode exhaust gas on line 4, after passage through heat exchanger 5 and shift reactor 22 (if included in the system), is passed via conduit 32d into the anode gas passage 32c of the cell. A voltage from the source 35 (this source might be derivable by tapping a portion of the voltage of cell 2) is then applied across the cell anode and cathode electrodes 32a and 33a. This voltage causes hydrogen in the applied exhaust gas passage 32c to be consumed at the anode electrode 32a while it also causes a like amount of hydrogen gas to be evolved at the cathode electrode 33a.

A portion of the hydrogen in the gas in passage 32c is thus effectively transferred to the passage 33c essentially free of other constituents. This undiluted hydrogen is then coupled via conduit 33e to the line 7 for recycle to the anode section 2a of fuel cell 2. The gas passing from the passage 33c, in turn, contains reduced amounts of hydrogen, and it is coupled via conduit 32e to line 11 for recycling to cathode section 2b of fuel cell 2.

Typically where cell 31 is a phosphoric acid cell, a voltage of 100 mV (0.1 V) will result in the aforementioned hydrogen gas consumption and evolution and thus the desired recovery of unused hydrogen from the anode exhaust. Since the unused hydrogen might typically provide close to a 0.8 V output in a molten carbonate cell used as the cell 2, the difference between the 0.8 V and 0.1 V required for the production of the hydrogen is added to the overall efficiency of the fuel cell system.

Furthermore, if 80% of the hydrogen produced from complete conversion of the methane fed to the fuel cell 2 is consumed and three-quarters of the remaining 20% of the unused hydrogen is recovered in the cell 31 and recycled, then the effective system efficiency will be substantially raised. This increase is further enhanced by the increase in voltage of the cell 2 attendant raising the partial pressures of hydrogen and carbon dioxide gases recycled, respectively, to the anode and the cathode sections 2a and 2b. The following specific examples illustrate in detail the increased efficiency realizable with the system 1.

EXAMPLE 1

In this example, the efficiency of a system in accordance with the invention and employing a stack of 32000 molten carbonate fuel cells is compared with a conventional system using the same number of cells, but without the recycling of unused undiluted hydrogen in accordance with the present invention. For present purposes, it has been assumed that all cells of each system are operating at approximately the same constant current density, and that the systems are to be compared based on cell voltages and net power output using the same quantity of methane in.

With the above assumptions, for a methane input of 100 lb-mole/hr, an oxidant input of 7709 lb-mole of air/hr and a cell current density of 160 mA/cm$^2$, the conventional system would operate at an average cell potential of 752 mV and produce 6.42 MW of power. The system in accordance with the present invention (but without shift reactor 22) would, in turn, operate at an average cell potential of 776 mV and would produce 6.5 MW of power, after subtracting the 0.12 MW of power required to operate the transfer device 6. If the system of the invention also included shift reactor 22, the system would operate at an average cell potential of 823 mV and would produce 6.6 mW of power after subtracting the 0.42 MW of power required for the operation of the transfer device. Thus the system of invention, without reactor 22, would be 1.25% more efficient than the conventional system and with reactor 22 would be 2.8% more efficient.

EXAMPLE 2

In this example, the assumptions of constant current density and the same amount of methane have been maintained, but an increase in the number of fuel cells over that employed in the conventional system has been allowed. This increase in the number of cells permits further recycled hydrogen to be used and, thereby, larger increases in efficiency to be obtained. Using the system of the invention without the reactor 22, but with the number of cells increased from 32000 to 34020, cell voltage decreases from 752 mV to 750.8 mV. However, the total power output increases to 6.74 MW after correcting for the power required for the transfer device. This is a 5% increase in efficiency over the conventional case due to higher overall fuel utilization. If the reactor 22 is added to the system and the number of cells increased to 35381, the net power now increases to 6.95 MW at a cell voltage of 749.8 mV for an 8.25% increase in efficiency.

It is important to note that while the above two examples demonstrate the increases in system efficiency realizable with the present invention, no attempt has been made in the examples to optimize the system parameters. With such optimization, further increases in efficiency can be expected. These increases, moreover, while not appearing large in magnitude, represent significant increases to those in the power generation industry where even a few percentage points improvement in efficiency represent widespread energy savings.

As above-noted, the principles of the present invention are applicable to high temperature internal reforming fuel cells, other than molten carbonate fuel cells. Thus, the invention is applicable to solid oxide fuel cells which operate at a higher temperature (approximately 1000° C.) than molten carbonate cells, but which like molten carbonate fuel cells cannot utilize all the hydrogen fuel process gas applied thereto. In the case of solid oxide fuel cells, all the fuel process gas cannot be used because the higher temperature causes a rapid drop in cell voltage as the concentration of hydrogen in the cell drops to low values. By utilizng the system of FIG. 1 with such cells, the unused hydrogen in the anode exhaust could be separated from the water and carbon dioxide and be recycled to the anode, thereby obtaining improved efficiency.

Figure 3:
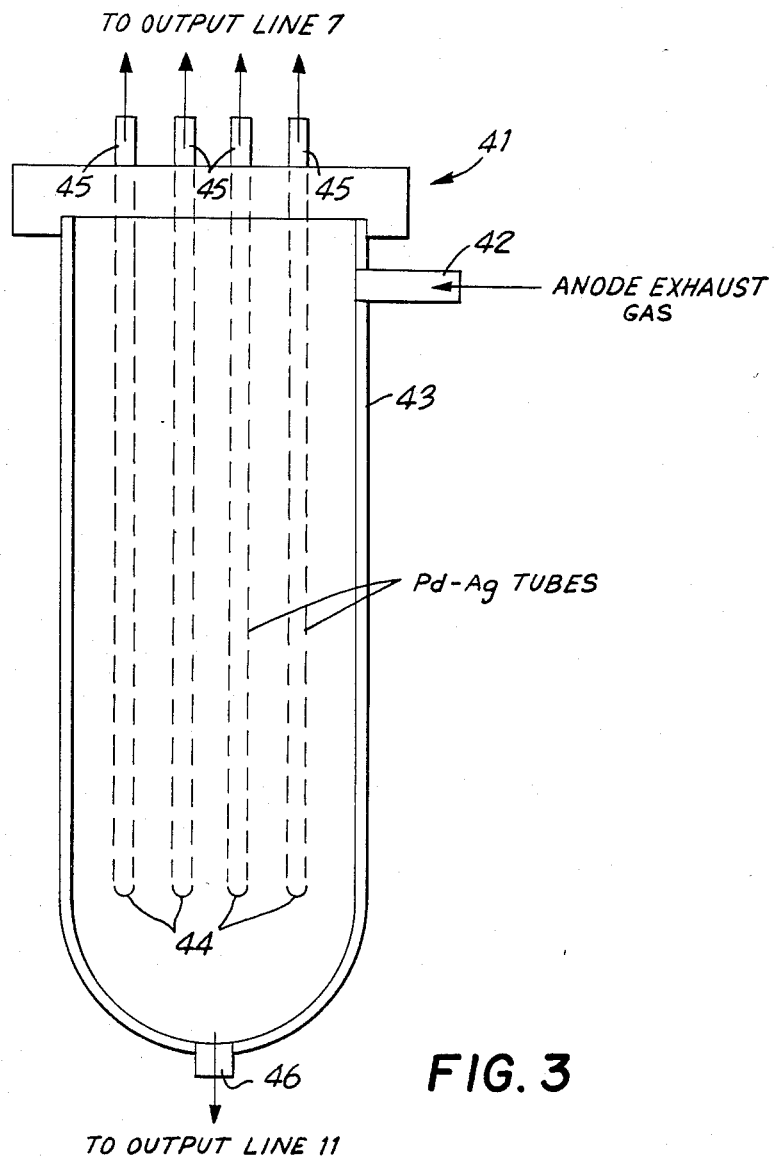
FIG. 3 shows a palladium-silver diffuser usable as the gas transfer device shown in FIG. 1.

As also above-indicated, various gas transfer devices other than electrochemical cells can be used to separate unused hydrogen from the anode exhaust gas in the system of FIG. 1. For example, as shown in FIG. 3, a palladium-silver diffuser 41 could be placed between the fuel cell anode exhaust and the recycle point and hydrogen would then pass selectively through the Pd-Ag diffuser. More particularly, the fuel cell anode exhaust gas in line 4 would be introduced into the inlet 42 of the chamber 43 of the diffuser. The hydrogen contained in the gas would diffuse through the Pd-Ag tubes 44 included in the chamber 43 and would pass therefrom, via outlets 45, to the output line 7. The remaining portion of the exhaust gas would, in turn, exit the chamber 43 through outlet 46 and pass to the output line 11.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A fuel cell system adapted to receive fuel having hydrocarbon content from a fuel supply, said fuel cell system comprising:
   a fuel cell including: means internal of the cell for reforming said hydrocarbon content of said fuel from said supply to produce fuel process gas; and anode and cathode sections for receiving fuel process gas and oxidant process gas;
   and means for receiving the gas exhausted from said anode section and for separating from said exhaust gas fuel process gas contained in said exhausted gas to the exclusion of the other gases contained in said exhaust gas, to thereby provide separated fuel process gas and remaining exhausted gas.

2. A fuel cell system in accordance with claim 1 further comprising:
   means for coupling said separated fuel process gas to the anode section of a fuel cell.

3. A fuel cell system in accordance with claim 2 wherein:
   said fuel process gas includes hydrogen.

4. A fuel cell system in accordance with claim 3 wherein:
   said fuel process gas includes carbon dioxide.

5. A fuel cell system in accordance with claim 4 further comprising:
   means for conveying said remaining exhausted gas to said cathode section.

6. A fuel cell system in accordance with claim 5 wherein:
   said conveying means includes means for burning any fuel process gas included in said remaining exhausted process gas prior to said remaining gas being conveyed to said cathode section.

7. A fuel cell system in accordance with claim 6 wherein:
   said conveying means further includes means for removing water from said remaining exhausted process gas prior to burning said exhausted process gas;
   and means for carrying said separated water to said fuel cell for use in said reforming means.

8. A fuel cell system in accordance with claim 1 wherein:
   said fuel cell is a high temperature fuel cell.

9. A fuel cell system in accordance with claim 8 wherein:
   said fuel cell is one of a molten carbonate fuel cell and a solid oxide fuel cell.

10. A fuel cell system in accordance with claim 1 wherein:
    said separating means includes a gas transfer device.

11. A fuel cell system in accordance with claim 10 wherein:
    said gas transfer device comprises electrochemical cell means having an anode and a cathode, said cell means transferring fuel process gas from said anode to said cathode upon voltage being applied to said cell means;
    and said exhausted gas is applied to said anode of said electrochemical cell means, whereby fuel process gas in said exhausted gas is transferred to said cathode and exhausted therefrom as said separated gas and said remaining gas is exhausted from said anode.

12. A fuel cell system in accordance with claim 11 wherein:
    said electrochemical cell means is a phosphoric acid electrochemical cell.

13. A fuel cell system in accordance with claim 11 further comprising:
    means for coupling said separated fuel process gas to the anode section of a fuel cell.

14. A fuel cell system in accordance with claim 13 further comprising:
    means for coupling said remaining exhausted gas to said cathode section.

15. A fuel cell system in accordance with claim 14 wherein:
    the fuel process gas in said anode section includes hydrogen and carbon dioxide.

16. A fuel cell system in accordance with claim 15 wherein:
    said fuel cell is a molten carbonate fuel cell.

17. A fuel cell system in accordance with claim 10, wherein:
    said gas transfer devices comprise a membrane permeable to said fuel process gas.

18. A fuel cell system in accordance with claim 17 wherein:
    said fuel cell is one of a molten carbonate fuel cell and a solid oxide fuel cell.

19. A fuel cell system in accordance with claim 10 wherein:
    said exhausted fuel process gas includes hydrogen and carbon monoxide; and
    said system further includes shift reactor means arranged between said fuel cell and said gas transfer device for converting said carbon monoxide to hydrogen.

20. A fuel cell system in accordance with claim 11 wherein:
    said fuel cell comprises one of a molten carbonate fuel cell and a solid oxide fuel cell.

21. A fuel cell system in accordance with claim 11 further comprising:
    means for supplying a portion of the voltage developed by said fuel cell to said cell means as said voltage.

* * * * *